United States Patent
Azizov et al.

(10) Patent No.: US 9,011,695 B2
(45) Date of Patent: Apr. 21, 2015

(54) POROUS MAGNETIC SORBENT

(75) Inventors: Abdulseid Abdulhamid Azizov, Baku (AZ); Mohammed Alfadul Sulaiman, Riyadh (SA); Vaqif Malik Akhmadov, Baku (AZ); Rasim Mirali Alosmanov, Baku (AZ); Irada Aydin Bunyad-Zadeh, Baku (AZ); Abel Mamedali Magerramov, Baku (AZ)

(73) Assignees: King Abdulaziz City for Science and Technology, Riyadh (SA); Baku State University, Baku (AZ); Abel Mamedali Magerramov, Baku (AZ)

( * ) Notice: Subject to any disclaimer, the term of this patent is extended or adjusted under 35 U.S.C. 154(b) by 0 days.

(21) Appl. No.: 13/877,722

(22) PCT Filed: Jun. 21, 2011

(86) PCT No.: PCT/AZ2011/000007
§ 371 (c)(1),
(2), (4) Date: Jun. 3, 2013

(87) PCT Pub. No.: WO2012/174616
PCT Pub. Date: Dec. 27, 2012

(65) Prior Publication Data
US 2013/0284968 A1    Oct. 31, 2013

(51) Int. Cl.
*B01J 20/06*    (2006.01)
*B01J 20/26*    (2006.01)
(Continued)

(52) U.S. Cl.
CPC ............ *C09K 3/32* (2013.01); *B01J 20/28009* (2013.01); *B01J 20/3295* (2013.01);
(Continued)

(58) Field of Classification Search
CPC .. B01J 20/321; B01J 20/3236; B01J 20/3295; B01J 20/28009; B01J 20/06; B01J 2220/46; B01J 2220/48; B01J 2220/4806; B01J 2220/4812; C09K 3/32; B03C 1/01; C02F 1/281; C02F 1/285; C02F 1/288; C02F 1/488; C02F 1/681; C02F 2101/32; C02F 2103/007
See application file for complete search history.

(56) References Cited

U.S. PATENT DOCUMENTS 4,201,831 A    5/1980    Slusarczuk et al.
4,941,978 A    7/1990    Gabrick
(Continued)

FOREIGN PATENT DOCUMENTS

| AZ | I-20050142 | 4/2002 |
|---|---|---|
| RU | 2049544 C1 | 12/1995 |
| RU | 94025664 A | 6/1996 |
| RU | 2063981 C1 | 7/1996 |
| RU | 2089283 C1 | 9/1997 |
| RU | 2097125 | 11/1997 |
| RU | 2104780 C1 | 2/1998 |
| RU | 2154526 C1 | 8/2000 |
| RU | 2169734 C1 | 6/2001 |
| RU | 2177964 C2 | 1/2002 |
| RU | 2179978 C1 | 2/2002 |
| RU | 2190214 C1 | 9/2002 |
| RU | 2224710 C1 | 2/2004 |
| RU | 2226126 C1 | 3/2004 |
| RU | 2241537 C1 | 12/2004 |
| SU | 1803388 A1 | 6/1990 |
| UA | 17038 U | 9/2006 |

OTHER PUBLICATIONS

Alosmanov et al., Acid base and sorption properties of phosphorus containing polymeric sorbent, 2010, Materials Reserach Innovations, vol. 10, Issue 5, pp. 414-418.*

*Primary Examiner* — David C Mellon
(74) *Attorney, Agent, or Firm* — Andrew M. Calderon; Roberts Mlotkowski Safran & Cole P.C.

(57) ABSTRACT

The invention relates to the field of producing polymer sorbents having magnetic properties, and can be used for removing petroleum products from a water surface. A magnetic porous sorbent for removing thin petroleum films from a water surface is proposed, said sorbent being produced on the basis of industrial synthetic divinyl rubber, as a result of the modification thereof by an oxidative chlorophosphorylation reaction with subsequent immobilization of magnetite FeO nanoparticles; and a method for producing a magnetic material is proposed, said method comprising the formation of FeO nanoparticles by an ion deposition method directly within a porous polymer matrix. The sorbent has a good sorption capacity in relation to thin petroleum films.

8 Claims, 4 Drawing Sheets

(51) Int. Cl.
  *B01J 20/32* (2006.01)
  *C09K 3/32* (2006.01)
  *B01J 20/28* (2006.01)
  *C02F 1/28* (2006.01)
  *C02F 1/48* (2006.01)
  *C02F 1/68* (2006.01)
  *C02F 101/32* (2006.01)
  *C02F 103/00* (2006.01)

(52) U.S. Cl.
  CPC ........... *B01J 20/3236* (2013.01); *B01J 20/321* (2013.01); *B01J 2220/4806* (2013.01); *B01J 2220/4812* (2013.01); *B01J 20/06* (2013.01); *B01J 2220/46* (2013.01); *C02F 1/281* (2013.01); *C02F 1/285* (2013.01); *C02F 1/288* (2013.01); *C02F 1/488* (2013.01); *C02F 1/681* (2013.01); *C02F 2101/32* (2013.01); *C02F 2103/007* (2013.01)

(56) References Cited

U.S. PATENT DOCUMENTS

| | | | | |
|---|---|---|---|---|
| 5,076,950 | A * | 12/1991 | Ullman et al. | 252/62.51 R |
| 8,354,022 | B2 * | 1/2013 | Fukaya et al. | 210/222 |
| 8,603,341 | B2 * | 12/2013 | Fukaya et al. | 210/671 |
| 2010/0224566 | A1 * | 9/2010 | Fukaya et al. | 210/671 |

\* cited by examiner

POROUS MAGNETIC SORBENT

FIELD OF THE INVENTION

The invention relates to a process for deriving polymeric porous sorbents which have magnetic qualities.

BACKGROUND OF THE INVENTION

There is big demand in industrialized countries for oil products, as is known, and more specifically to the necessity to transport oil in significant quantities, including by means of water transportation. At the same time, technological processes, which involve oil extraction, oil processing, transportation and storage of oil products constitute one of the most anthropogenous reasons for mass pollution of water surfaces. Besides, special danger stems from accidents which occur on oil pipe lines, since oil pollution due to an accident differs from many other incidents in that it provides not a gradual, but, usually, a "salvo" load on the environment, requiring fast responsive reaction.

Among the methods which are successfully used to solve the problem of the liquidation of the results of pollution is sorbate purification of water. The advantages of the sorbate method can include the ability to remove pollution of practically any kind to achieve any final concentration, and also the ability to control the process.

Currently, for the purification of the water surface from oil products and other hydrocarbonic products, both natural sorbents, which have certain advantages, and different synthetic sorbents are widely used. Taking into account modern requirements for these kinds of materials, some of the main qualifications which such sorbents should possess are: high specific surface of material, which increases its contact with the pollutants and which, at the same time, provides for effective absorption; low specific mass, which guarantees enough floating of the adsorbent, including after its contact with the pollutants; and the ability to effectively remove sorbent from the water surface together with adsorbing pollutants. Synthetic porous polymeric materials also possess the distinctive ability to change porosity within a wide range, while having the same chemical structure.

In one synthetic sorbent, the powder of elastoplastic block-copolymers of styrole with ethylene and butylene is used as the absorbent. Liquid oil is covered with the powder polymer, is soaked up by it, and a light, hard material with a non-oily and non-sticky surface is gathered and removed from the surface of the water. The technological difficulty of gathering of the absorbent form the surface of the water and impossibility of regeneration are some of the disadvantages of this method.

In another synthetic sorbent, fibrous material made from polypropylene and modified basalt fiber coated with surface-active material (monoalkyl ethers of polyethylene glycol and monoalkylphenil ethers of polyethylene based on a polymer distillate) is used to remove thin oil plaque from the water surface. Some disadvantages of this method are the impossibility of regeneration of the absorbent and restrictions on the thickness of the removed plaque.

A sorbent based on a fibrous cellulose material, coated with block-copolymers styrole with butadiene, has been developed in order to gather oil and oil products. A sorbent with magnetic qualities was reported using iron chloride, iron shavings and chrome-containing washing waters with an ion ratio of Cr(VI)/Fe(III) 1:1. This sorbent is primarily designed to purify waste waters from the ions of heavy metals and it does not have flotation ability and mechanical durability.

The macroporous sorbent-copolymer styrole with divinylbenzene (40%), obtained by the method of suspension polymerization, is used for sorbent removal of multi-component organic compounds from water mixtures when processing large volumes of waste waters. This sorbent does not possess magnetic qualities and cannot be used for removal of the oil pollution from the water surface.

A highly porous sorbent with good flotation ability, which provides it with high sorbate qualities, was developed on the basis of the high-molecular polyethylene, the active part of which is composed of natural aluminum silicate. This sorbent, in general, is used to purify water environments from radionuclides of cesium and it does not possess magnetic qualities.

In order to remove oil and its products from the water surface, sorbent with flotation ability and high absorbing ability with respect to oil and its products, which includes lightly crosslinked vulcanizate, based on the isoprene rubber and vulcanizing system, and latex foam rubber, was developed. However, this sorbent does not possess magnetic qualities, which make its removal from the water surface difficult.

Nowadays, sorbents based on sewn and over-sewn polymers, which have good porousness, high mechanical durability and high sorbent qualities, are widely used. Highly-porous sorbents based on over-sewn polystyrol, which are successfully used in different means of purification and removal of chemicals for medical purposes, in the pharmaceutical industry, in cosmetics (production of phospholipids, nucleic acids, extraction of saponins), and also in chromatography and production of bio- and hemocompatible sorbents, are known.

For adsorption of oil and organic dissolvents from fresh- and seawater, a product of special cross-cut stitching in chlorinated hydrocarbon with a sewing agent and a catalytic agent of polystyrol, a triple copolymer of sterol, ethylene and butadiene is used. However, the absence of magnetic qualities of the sorbent makes it difficult to remove it from the water surface after its saturation with the oil products.

In known references, the problem of removal of toxic substances from water and gas environments is solved with the help of a porous granulated sorbent, which includes a polymer matrix, based on a porous granulated ionic (polystyrol, epoxypolyomid, vynil pyridinic matrix) and iron hydroxide. The abilities of this sorbent for removal of oil products from the water surface are limited by the absence of magnetic qualities, low mechanical durability and flotation ability.

Magnetic porous sorbents might contain hydrophobic polymer binding medium in the shape of granules or powder (polyethylene, polypropylene, polystyrol, mix of polyethylene granules and copolymer ethylene with vynil acetate, mix of butadiene-neutral rubber and polyethylene (or polystyrol and vynilchloride)), magnetic filler, mineral oil and aluminosilicate porous filler, modified by hydrophobizated organo-silicone liquid.

A porous sewn or over-sewn polymer (sewn polyolefin foams, polyvinyl chlorides, polymers and styrole copolymers) is known with the sewn ratio of no less than 60%, with specific surface of 800-1900 $m^2/g$, with the use of magnetic filler with the size of a particle ranging from 1 to 10 mkm. Acting as the porous polymer matrix, the sorbent can contain sewn polymer, obtained through copolymerization in the mixture using bi-functional compounds acting as sewn agents (for example, 4,4 bischlorometyldefinyl, xylendichlorid, monochloridemethyl ether).

Oversewn polystyrol can be used as the polymer matrix, obtained through swelling of styrolediynilbenzole copolymers in the chloro-containing organic liquid, addition of bi-functional compounds, which interfere in accordance with Friedel-Crafts reaction, by heating of the reacting mixture, filtration and cleansing of the polymer with the ratio of bifunctional compound to copolymer styrole at (0.5-1):1, and by heating at 70-140° C. for 6-11 hours. Foaming is performed either before sewing of the polymer matrix, or after receipt of the sewn polymeric structure (foaming with backpressure). Magnetic sorbent is prepared by means of consecutive swelling of polymer matrix in the dissolvent at 50-70° C., followed by its saturation while in swollen state with magnetic filler, which fills part of the channels of the polymer matrix. Nano-particles of metallic iron are prepared by means of regeneration of compound of iron with hydrogen (at 250-400° C.) with subsequent stabilization in 0.1-0.5% solution of oleic or stearic acid. The multistage nature of the production process and the necessity to use high temperatures are some of the disadvantages of the process.

SUMMARY OF THE INVENTION

The task of the invention is the development of a porous magnetic sorbent on the basis of available raw materials and an easy technological process, which possesses good sorbent ability with respect to thin oil plaques and that can be easily removed from the water surface.

This task is solved by the above-identified porous magnetic sorbent, which includes a polymer matrix and magnetic material. The porous magnetic sorbent can contain synthetic resin synthetic divinyl rubber (SDR), functionalized by phosphone—$P(O)(OH)_2$ and phosphate—$OP(O)(OH)_2$ groups, serving as a polymer matrix, and magnetic filler—$Fe_3O_4$.

DETAILED DESCRIPTION OF THE INVENTION

Magnetic porous sorbent was prepared from industrially synthetic rubber (SDR), followed by modification by an oxidizing chlorophosphorylation reaction followed by immobilization in the polymer matrix of synthesized "in situ" magnetite nano-particles. Modification of SDR is performed through oxidizing chlorophosphorylation after being subjected to $PCl_3$ in the presence of $O_2$ in a $CCl_4$ environment, followed by hydrolysis of the formed phosphon- and phosphatedichlorinade groups. As the result of the modification, ionogenic phosphon—$P(O)(OH)_2$, and phospahe-acidic—$OP(O)(OH)_2$ groups, which possess ion-exchange and complexing abilities, are injected into the structure of the rubber. Rubber modification by the above-identified means leads to the formation of the porous product with a dimensional-cellular structure, which is proved by IK-research and by the data of the X-ray diffraction analysis of received samples of the modified product. The porous structure of the sorbent is provided by the foaming of HCl, discharged as the result of the reaction, and also through the use of inert dissolvent, which perfectly dissolves the initial components of the mixture, but practically does not dissolve resulting product of the reaction. The advantage of this means of modification lies in the formation of the porous polymer matrix and the process of sewing, which takes place parallel to the functionalization of the rubber SDR and is performed during modification, i.e. during one stage.

Figure 1:
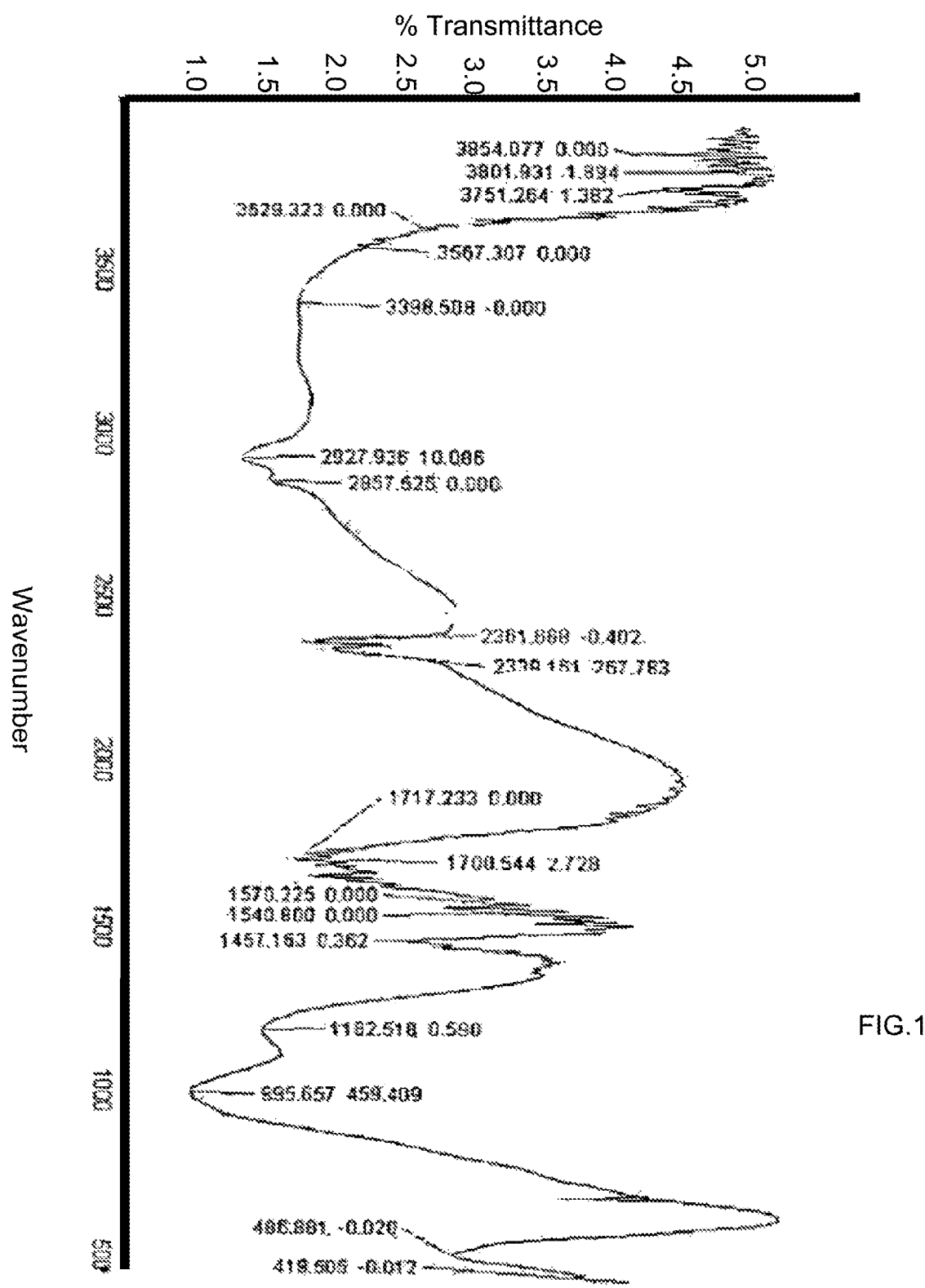
FIG. 1 shows a spectrum of modified synthetic divinyl rubber (SDR) in accordance with the invention.
Figure 2:
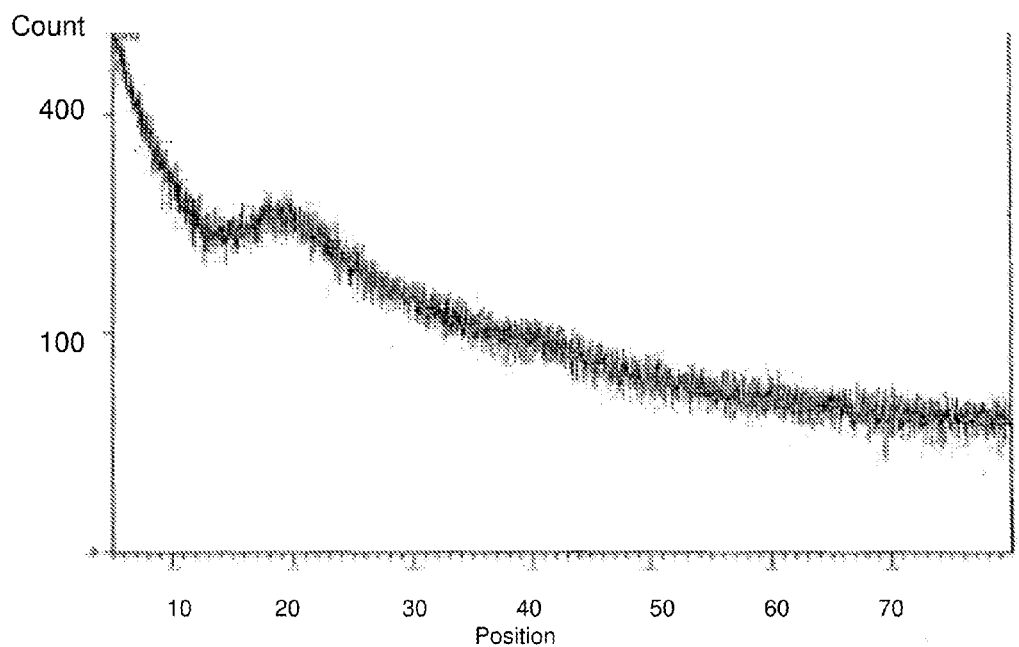
FIG. 2 shows data from X-ray diffraction analysis of received samples (top—SDR, modified by oxidizing chlorophosphorylation; bottom—magnetic sorbent based on the modified SDR, which contains $Fe_3O_4$.
Figure 2:
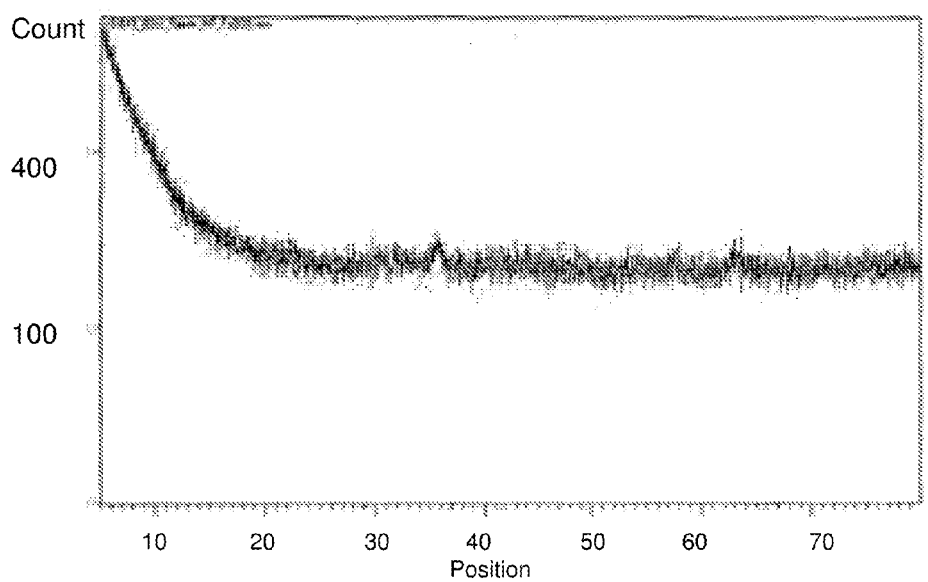

FIG. 1 shows an IR spectrum of modified synthetic rubber SDR. The spectrum of the sorbent in $H^+$ shows valence vibration of groups P=O, connected by the hydrogen connection, corresponding to lines with a maximum at 1170 $cm^{-1}$ and 1135 $cm^{-1}$. Wide lines may result in the overlapping of separate lines, stipulated by the hydrogen connections of various strengths. Lines at 980 $cm^{-1}$ and 1010 $cm^{-1}$ can be related to the deformational vibrations of the connection P—O(H): out of plane rotating and inside the plane, respectively.

Though insertion into the polymer matrix of very polar groups decreases its hydrophobic nature, and by the same decreases its lipophilic nature, the presence of polar groups in the polymer matrix allows the matrix to perform a more organized sorption of the magnetite particles.

The modified product obtains its magnetic qualities as the result of the molecular sorption of nano-size particles $Fe_3O_4$, received directly in the polymer matrix by means of chemical coprecipitation of the iron salts $FeCl_2$ and $FeCl_3$, in the alkaline environment (pH 14).

A porous magnetic sorbent is achieved by the following means.

SDR modification is performed through oxidizing chlorophosphorylation using $PCl_3$ in the presence of oxygen, followed by hydrolysis of the received modified product.

To perform oxidizing chlorophosphorylation, a device, composed of round-bottomed flask, equipped with mechanical mixer, thermometer, reverse refrigerator and a bubbler to supply oxygen, can be used. $CCl_4$ is used as a solvent for the polymer. First, a polymeric mixture of the necessary concentration is prepared and placed in the flask. During the agitation of the reacting zone with oxygen, the calculated amount of $PCl_3$ is added, with constant stirring of the content of the flask. The exothermic nature of the process is shown by the increase of the temperature to 50-55° C. Exhaled chlorous hydrogen is removed by the oxygen and is by captured by a 2n mixture of hydroxide natrium. At the end of the reaction the solvent, non-reacting products and by-products of the reaction are distilled by a water jet pump. After that, modified polymer remaining in the flask, is hydrolyzed by adding distilled water to it, followed by the heating of the mixture for 2 hours at 45-50° C. The modified product obtained is separated by filtration and is dried at 50° C. in a vacuum-drying oven.

The modified product receives its magnetic qualities by the following means. A sample weight of the sorbent is placed in a flat-bottomed flask, equipped with a reverse refrigerator. After that, the necessary amount of $FeCl_2$ mixture is added to the flask, and while mixing by magnetic mixer, the temperature is raised to 70° C. Next a solution of $FeCl_3$ $6H_2O$ is added in a specified ratio with respect to $FeCl_2$. After that, with the addition of a mixture of NaOH, a mixture with a pH of 14 is obtained. Black magnetite powder, formed as a result of the chemical coprecipitation of salts, at the moment of its formation is sorbated in the polymer matrix. Processing is performed within one hour. The resulting magnetic sorbent is washed by distilled water until a neutral pH is reached and the sorbent is dried then dried using fresh air.

The dependency of sorption (S—square of the oil spill, purified by the sorbent, in %) on the amount of the sorbent used, has been studied.

Figure 3:
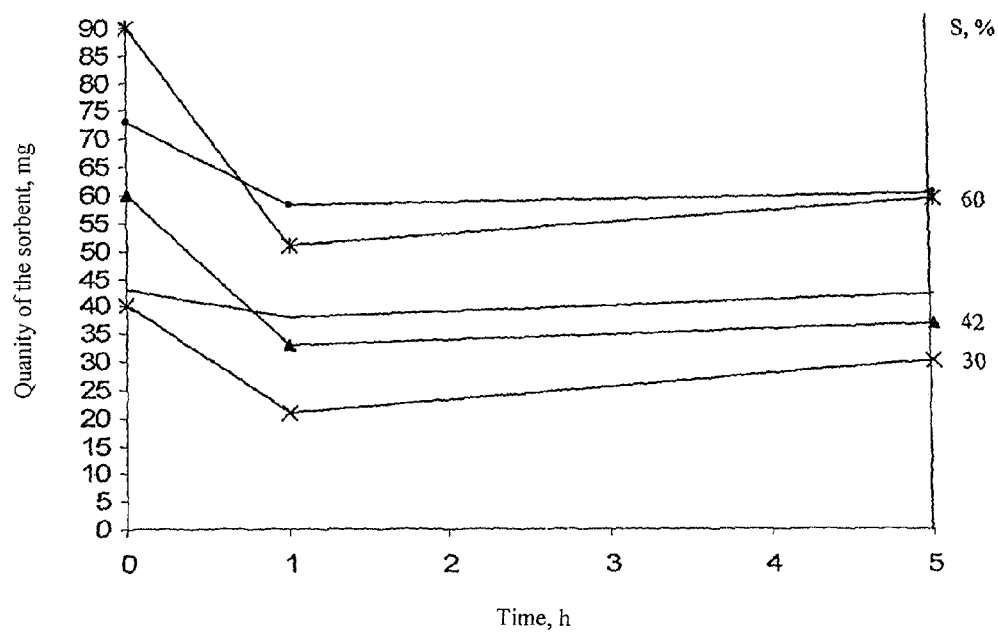
FIG. 3 shows dependency of the surface of the sorbed oil on the quantity of the sorbent.

An increase in the amount of the sorbent used leads to significant increase in the square S of the sorbated oil. As can be seen from the received data (FIG. 3), the main amount of the oil is sorbated during the first 4 hours.

Figure 4:
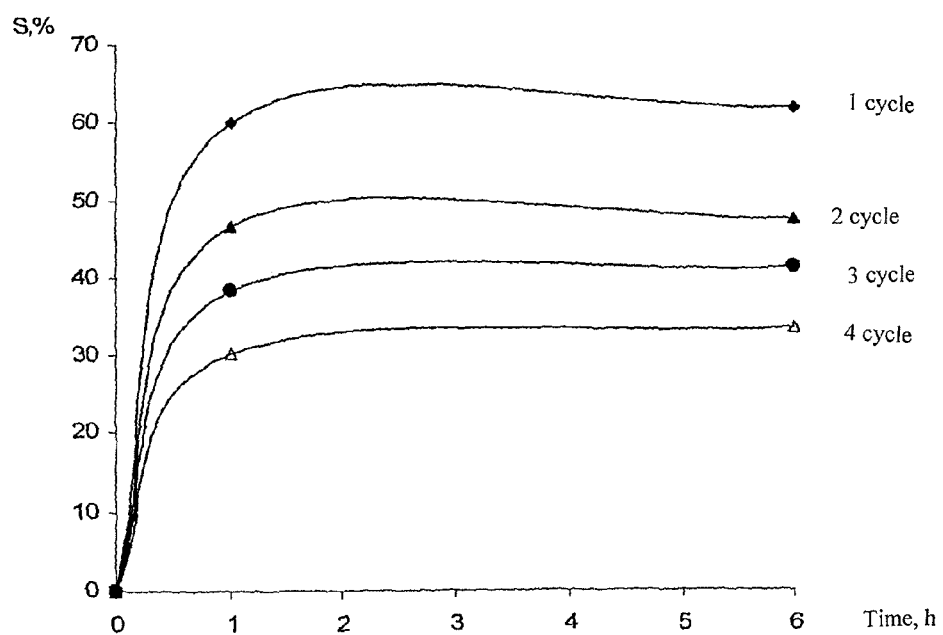
FIG. 4 shows dependency of the sorbate ability of the sorbent on the number of use cycles.
Figure 5:
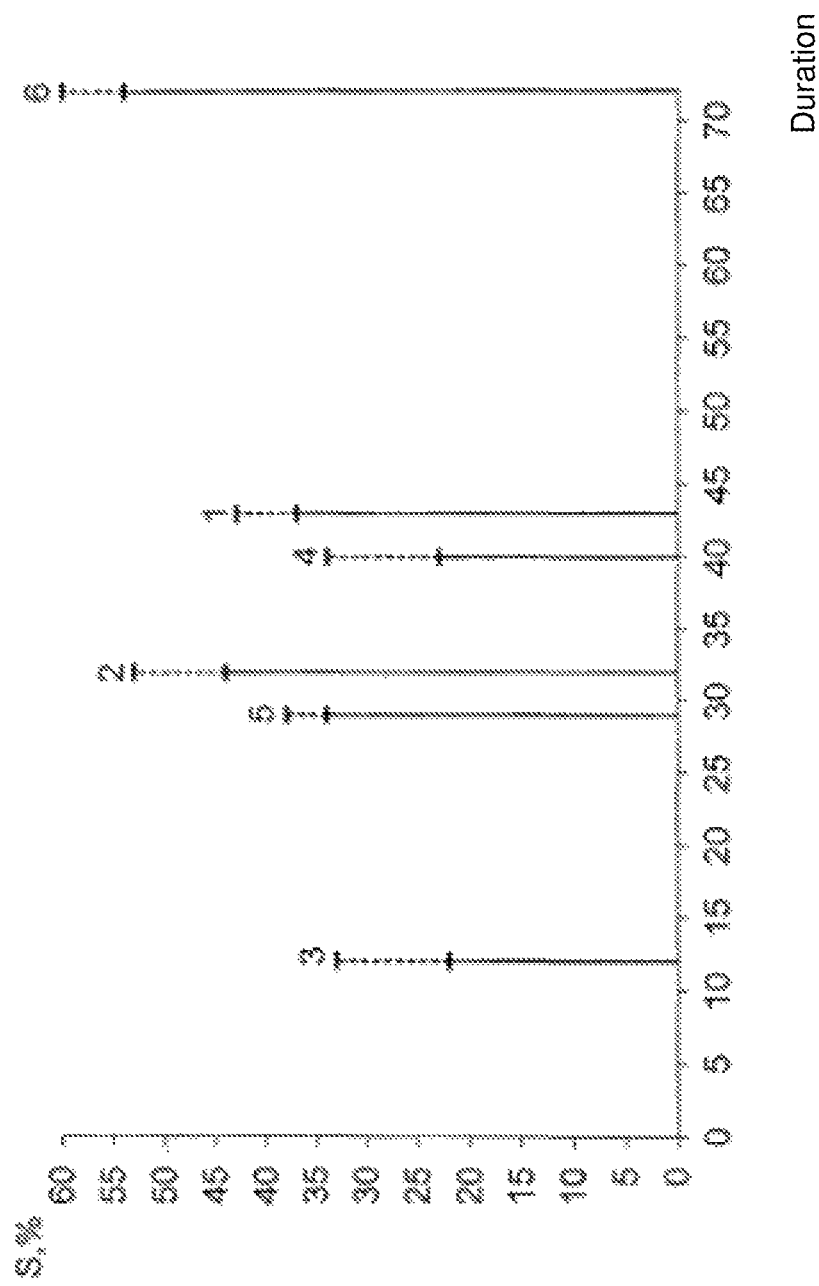
FIG. 5 shows dependency of oil sorption on its duration (solid line—first hour of sorption, dotted line—next 4 hours of sorption). 1 and 6—sorbent is in the first cycle of use; 2, 3—sorbent is in the second cycle of use, 4—sorbent is in the 10th cycle of use, and 5—sorbent is in the 4th cycle of use.

FIG. 4 represents results of the research of the dependency of the sorbate ability of the sorbent on the number of the cycles of its use.

EXAMPLES

Example 1

Obtaining the Polymer Matrix 50 g of SDR (technical parameters are shown in table 3) is placed in a three-neck flask with a 1 L capacity and 0.5 L of $CCl_4$ is added. Twenty-four hours later (after uniform solution has been formed) the reaction is initiated by means of adding oxygen (with speed of 7 L/hour) to the reacting zone, which has been dried above sulphuric acid, and adding $PCl_3$ (75 ml). Chlorous hydrogen, exhaled in the process of the reaction, is captured by a 2n solution of hydroxide natrium. The reaction is continued for 13 hours with a batch addition of 100 ml more $PCl_3$. After distillation of the by- and non-reacting products with the help of a water-jet pump, the resulting mixture is hydrolyzed under ice water. After that, hydrolysate is heated to 50° C. and allowed to continue to hydrolyze for 5 more hours. The product of the reaction is washed by water until a neutral pH is reached and is then dried at 50° C. in a vacuum-drying oven. The amount of product made was 135 g.

Example 2

Obtaining the Magnetic Sorbent 2.5 g of the modified SDR is placed in a one-neck flask with a 0.25 L capacity, and 42 ml of $FeCl_2$ (0.1 M p-p) are added. The contents of the flask are heated to 70° C., and afterwards 14 ml $FeCl_3$ (0.2 m p-p) and 4 M p-p NaOH are added, in the amount necessary to reach pH 14. The contents of the flask are mixed for 1 hour with the help of a magnetic mixer. Afterwards, the contents of the flask are filtered, washed with distilled water and is dried using air. The amount of product made was 4 g.

Example 3

Examination of the Sorbate Ability of the Sorbent 0.054 g of magnetic sorbent is distributed on the surface of an oil spill with an area of 44 $cm^2$. Fourty-eight hours later (after full loss of magnetic qualities) the sorbent together with the sorbated oil are filtered, dried using air and weighed. The addition in weight was 0.011 g. Therefore, 1 g of sorbent sorbates 0.2 g of oil (1 cycle of use of the sorbent).

Example 4

Examination of the Sorbate Ability of the Regenerated Sorbent 0.090 g (4 cycles of use) of magnetic sorbent is distributed on the surface of an oil spill. Twenty-four hours later, the sorbent together with the sorbated oil are filtered, dried using air and weighed. The addition in weight was 0.018 g. Therefore, 1 g of sorbent sorbates 0.2 g of oil after its 4-time usage.

TABLES

TABLE 1

| Indicators | Value |
| --- | --- |
| Appearance | Dark-brown colored free-flowing powder-like material |
| Initial material | Rubber SDR |
| Oil capacity, g/g | 0.2 |
| Flotation ability, per hour | 96 |
| Regeneration type | Washing by the solvent |
| Number of regeneration cycles | 11 |

TABLE 2

| Cycle of use | Sorbtion capacity, g/g |
| --- | --- |
| 1 cycle | 0.2 |
| 5 cycle | 0.18 |
| 8 cycle | 0.14 |
| 11 cycle | 0.08 |

TABLE 3

| Name of the material | SDR |
| --- | --- |
| Viscosity per Muni, MB 1 + 4 (100°) | 40-50 |
| Variance in viscosity inside the material, no more than | 8 |
| Mass content of ashes, %, no more than | 0.3 |
| Loss of mass during drying process, %, no more than | 0.8 |
| Relative durability at traction, Mpa ($kgs/cm^2$), no less than | 19, 1 (195) |
| Relative extension at rupture, %, no less than | 480 |
| Relative final deformation after the rupture, %, no less than | 12 |
| Elasticity at bounce, %, no less than | 0.3 |
| Relative tension at 300% of extension, Mpa ($kgs/cm^2$), no less than | 6.9 (70) |
| Mass volume of antioxidants, %, no more than | 0.4-0.1 |

The invention claimed is:

1. A porous magnetic sorbent, comprising
   a polymer porous matrix comprising a synthetic divinyl rubber functionalized by phosphone and phosphate groups; and
   a magnetic material attached to the polymer porous matrix, comprising nano-particles of $Fe_3O_4$.

2. The sorbent of claim 1, wherein the functionalized synthetic divinyl rubber is prepared using oxidizing chlorophosphorylation.

3. The sorbent of claim 1, wherein the sorbent sorbes at least about 0.2 gram of oil per 1 gram of sorbent.

4. A method for preparing a porous magnetic solvent comprising:
   modifying a synthetic divinyl rubber using oxidizing chlorophosphorylation to produce a modified synthetic rubber with phosphon- and phosphatedichlorinade-groups;
   hydrolyzing the modified synthetic divinyl rubber with phosphon- and phosphatedichlorinade-groups to produce a modified synthetic divinyl rubber with phosphone and phosphate groups; and sorption of nano-sized particles $Fe_3O_4$ into the modified synthetic divinyl rubber with phosphone and phosphate groups.

5. The method of claim 4, wherein the oxidizing chlorophosphorylation is carried out using $PCl_3$ in the presence of $O_2$ in $CCl_4$.

6. The method of claim 4, wherein the sorption occurs through ionic layering.

7. The method of claim 4, wherein the nano-sized particles of $Fe_3O_4$ are received in the modified synthetic divinyl rubber with phosphone and phosphate groups by chemical coprecipitation of the iron salts $FeCl_2$ and $FeCl_3$ in an alkaline environment.

8. The method of claim 4, further comprising foaming HCl formed during the oxidizing chlorophosphorylation of synthetic divinyl rubber step.

\* \* \* \* \*